United States Patent
Erb

(10) Patent No.: US 6,504,922 B1
(45) Date of Patent: Jan. 7, 2003

(54) REMOTE PERIPHERAL SWITCH BACKUP CALL SERVICE MECHANISM

(75) Inventor: Paul Erb, Ottawa (CA)

(73) Assignee: Mitel Corporation, Kanata (CA)

( * ) Notice: Subject to any disclaimer, the term of this patent is extended or adjusted under 35 U.S.C. 154(b) by 0 days.

(21) Appl. No.: 09/435,581

(22) Filed: Nov. 8, 1999

(30) Foreign Application Priority Data

Nov. 18, 1998 (GB) .............................................. 9825286

(51) Int. Cl.[7] .................................................. H04M 7/00
(52) U.S. Cl. .............................. 379/221.04; 379/221.05
(58) Field of Search ........................ 379/221.01, 221.02, 379/221.03, 221.04, 279

(56) References Cited

U.S. PATENT DOCUMENTS

| | | | | |
|---|---|---|---|---|
| 4,811,388 A | * | 3/1989 | Westerhof et al. | 379/229 |
| 5,175,866 A | * | 12/1992 | Childress et al. | 370/216 |
| 5,912,963 A | * | 6/1999 | Begeja et al. | 379/220.01 |
| 6,366,662 B1 | * | 4/2002 | Giordano et al. | 370/217 |

FOREIGN PATENT DOCUMENTS

| | | |
|---|---|---|
| DE | 0197 312 | 3/1986 |
| GB | 2 299 485 A | 10/1996 |
| WO | WO 97/22208 | 6/1997 |

\* cited by examiner

*Primary Examiner*—Ahmad F. Matar
*Assistant Examiner*—Hector Agdeppa
(74) *Attorney, Agent, or Firm*—Keating & Bennett, LLP

(57) ABSTRACT

A system for providing local call connection services via local call control services in a remote peripheral in the event of a loss of communication between the remote peripheral and a main controller, comprising a local memory within the remote peripheral for receiving and synchronizing copies of dialing plans and local device configurations from the main controller for use by the local call control services during the loss of communications, a backup call services manager for receiving requests for service from devices connected to the remote peripheral, transmitting these requests to the main controller while the communication between the remote peripheral and main controller is established, and while the communication is lost instantiating a local device handler for each of the requests, a further local memory within the remote peripheral for maintaining current device state for each of the devices, and wherein each local device handler receives a corresponding one of the requests and in response consults the further local memory and uses the local call control services for providing local call connection services.

6 Claims, 1 Drawing Sheet

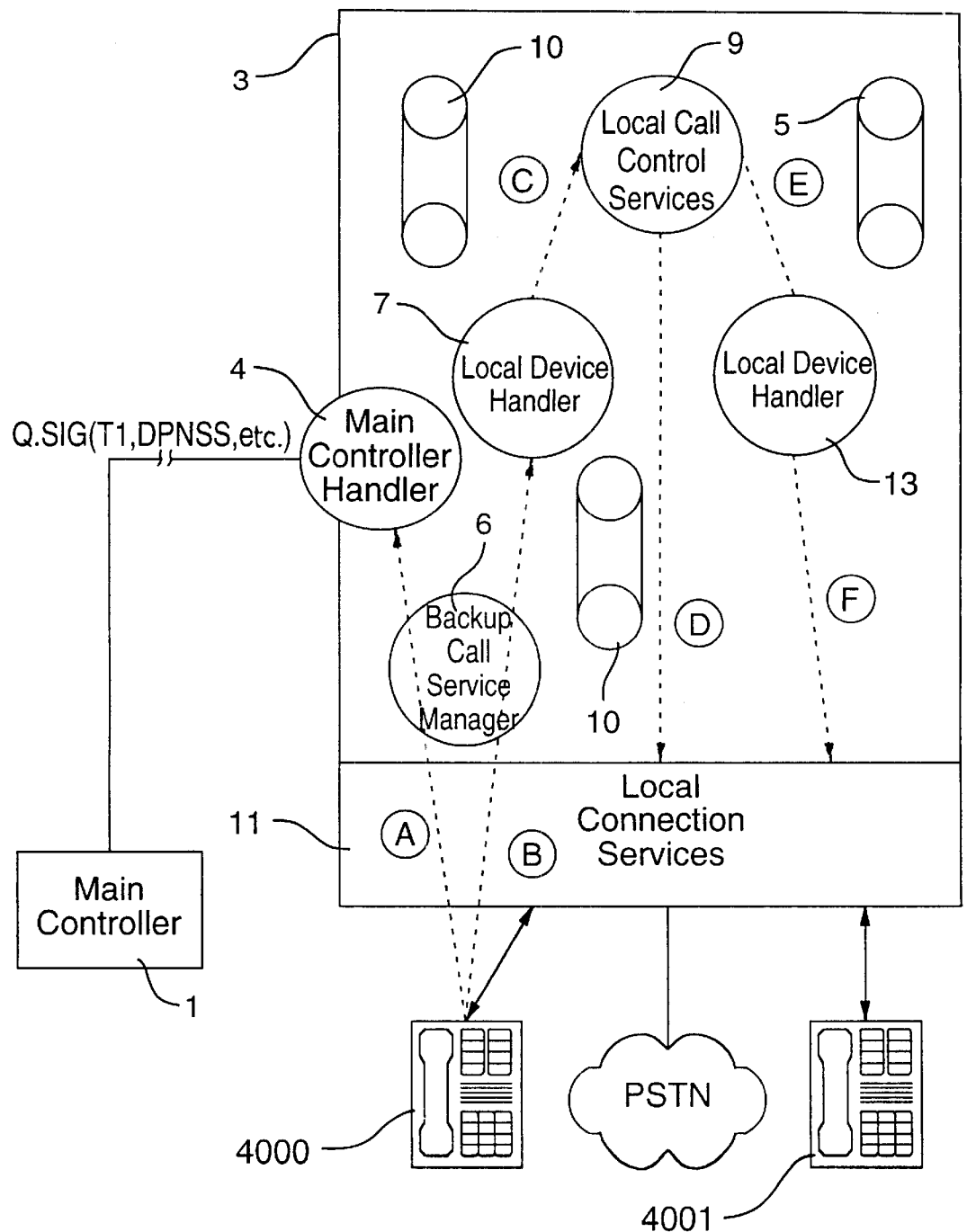

REMOTE PERIPHERAL SWITCH BACKUP CALL SERVICE MECHANISM

FIELD OF THE INVENTION

This invention relates in general to Open Telecom Platform (OTP) communication systems, and more particularly to a remote peripheral switch connected to a main controller for performing local management in the event of loss of communication with the main controller.

BACKGROUND OF THE INVENTION

Open Telecom Platform (OTP) represents a generic platform for the development of a wide range of telecommunications products encompassing both traditional PBXs and emerging convergent CTI systems. It provides generic services and capabilities, both hardware and software, for use as basic building blocks in specific product instances. Examples of software applications are voice mail and automated attendant which may be invoked using APIs (Application Programming Interfaces) such as TAPI (Telephony Application Programming Interface). Hardware examples include primary power interconnects (e.g. AC mains or DC input), PSTN interfaces (e.g. LS/Class and T1), and on-premise interfaces (e.g. Digital Network Interface Card (DNIC), fiber, etc.)

In an OTP system, a plurality of nodes may be interconnected and connected to external interfaces (e.g. the PSTN). A master node may be connected to one or both of a smart slave node or a dumb slave node. Each of the nodes includes a plurality of Node Interconnect Cards (NICs). The master node and smart slave node further include intelligence functionality in the form of a Real Time Processor (RTP). The interconnect media between nodes can consist of a single or multiple paths and, architecturally, may be realized as point-to-point connections or as paths provided via a network.

The master node exerts fundamental responsibility for real-time telephony functionality within the system. This node is able to determine its responsibility by detecting one of either a full system program load (e.g. via a program card or flash memory), or a prime program download (e.g. by means of an Ethernet port connected to a remote system). In some embodiments-the master node RTP will provide the sole processing function for the OTP system. In other embodiments, subordinate processing functions may be provided in other nodes, such as smart slave nodes, in which case the master node RTP establishes the operational parameters for the subordinate processing functions (e.g. via initialization and a subordinate download operation).

The smart slave node provides at least one subordinate processing function via its RTP, for controlling its associated node. Other processors may be resident on the node for providing other system functions, but only one RTP assumes node control responsibility.

The dumb slave node provides no node control processing functionality. Instead, its NIC acts as a proxy for a remote node controller (i.e. master node or smart slave node). It will be appreciated that the dumb slave node may incorporate processing resources, none of which provide a node control function.

In the context of OTP a PBX main controller functions as the master node to manage calls for all devices in the communication system. With geographical distribution of remote peripherals, loss of communication with the main controller is possible. In the event of a loss of communication between the main controller and a remote peripheral, it is desirable that call management be performed locally within the peripheral to ensure continued service to users connected to the peripheral.

Geographically distributed remote nodes (intelligent peripherals) are known in the prior art for managing local call control. The remote nodes are connected to a hub, which is also a main controller but which does not manage call control within the remote nodes. The remote nodes communicate with the hub via a peer-to-peer networking protocol such as DPNSS or Q.SIG. Accordingly, the remote nodes function as main controllers (i.e. master nodes) in and of themselves, with the attendant costs and system management considerations.

SUMMARY OF THE INVENTION

According to the present invention, local handling of calls is provided to individual devices within the peripheral in the event of loss of communication with the main controller. Handoff of control from the main controller to the remote peripheral is seamless since the call handling takes place as individual device requests occur. Handoff of call control from the remote peripheral to the main controller is similarly seamless upon completion of a call being serviced by the remote peripheral, without a loss of system integrity. The level of call control provided by the remote peripheral can be minimal (i.e. POTS) or rich in features provided by specific devices in the remote peripheral.

BRIEF DESCRIPTION OF THE DRAWINGS

A detailed description of the preferred embodiment of the present invention is described herein below, with reference to FIG. 1 which is a block diagram of a remote peripheral configured to provide local call control in the event of a loss of communication with a main controller.

DETAILED DESCRIPTION OF THE PREFERRED EMBODIMENT

With reference to FIG. 1, a main controller 1 is shown connected to a remote peripheral 3 via a communication link (e.g. T1, DPNSS, etc.). In normal operation, the main controller 1 establishes and tears down calls between devices connected to the peripheral 3 (e.g. telephones sets 4000 and 4001, PSTN trunks, etc.), via a main controller handler 4 and backup call service manager 6. However, in the event of a loss of communication between the main controller 1 and peripheral 3, local channel switching is provided according to the present invention to establish call connections within the remote peripheral 3.

For example, if telephone device 4000 goes off-hook during a communication outage with main controller 1 and dials telephone device 4001, local call control is established within remote peripheral 3 so that telephone 4001 rings and, when answered, a call is completed between the telephones 4000 and 4001, as described in greater detail below.

A copy of the dialing plan and local device configuration from the main controller 1 is maintained and synchronized within a database 5 of the remote peripheral 3, in a well known manner (i.e. the contents of the database or memory 5 are updated either periodically or by notification), in order to implement the local call control functionality within remote peripheral 3.

In the event of a loss of communication, the remote peripheral 3 does not immediately take any action. However, as each subsequent device request is received by the backup call service manager 6, a local device handler is instantiated and associated with the requesting device. The request is passed to the local device handler which then proceeds with call handling via local call control services 9. For example, an off-hook request from telephone 4000, which normally is sent to the main controller 1 via path A, cannot be delivered in the event of a communication loss with the controller. Therefore, a local device handler 7 is instantiated for device 4000 by the backup call service manager 6 as an instantiation of an appropriate call handler class (e.g. a COM object in the MANA agent architecture of Mitel Corporation). The device handler 7 receives the request via path B, determines the existing state of the device by means of accessing a database table 10 of significant device states (e.g. busy, idle, originating, out of service—but not transient states or special states required by the main controller 1), and provides local call control services for the request (e.g. basic call, forward, transfer, etc.) via local call control services 9.

If the requested service is not available, an indication is given to the user. This indication can be in the form of a recorded announcement (e.g. .WAV file) generated by the backup call services manager 6, or a message displayed at the device (i.e. telephone 4000), such as "service temporarily unavailable".

On the other hand, if the requested service is available, the local device handler 7, having already determined that the device 4000 is idle, sends a message via path C to local call control services 9 to respond to the off-hook request. Local call control services 9 sends a message to local call connection services 11 via path D, which in turn generates dial tone for the telephone 4000 in the usual manner.

The local device handler 7 manages basic call control (i.e. POTS) and additional features, depending on system provisioning and configuration. Thus, features which are locally available to the device 4000 (e.g. pager softkey, etc.) are presented to the device via device handler 7. Features which are only provided by the main controller 1 (e.g. corporate phone book, centralized voice mail, etc.) are not presented to the device 4000. The device handler 7 receives all requests for its associated device until the current call control activity is completed (i.e. the call is terminated).

Thus, returning to the scenario above wherein telephone device 4000 wishes to complete a call to telephone device 4001, the local device handler 7 receives the dialed digits from device 4000 and, using local call control services 9 and the dialing plan 5, initiates a call to device 4001. Since, as discussed above, there has been a communication loss with main controller 1, a local device handler 13 is created for the device 4001. If, on the other hand, communication with the main controller 1 had been re-established, than the initiate call request would instead be sent by the backup call service manager 6 to the main controller 1 for servicing.

The local device handler 13 is informed by the backup call service manager 6 on instantiation that the device 4001 is idle (i.e. by accessing the device state table 10). The device handler 13 receives the initiate call request via path E, and sends a message to local connection services 11 via path F requesting a call connection with device 4001 (i.e. the device. 4001 is provided with ringing signal). When device 4001 goes off-hook to answer the call, local device handler 13 establishes a connection with device 4000 using local connection services 11 in a well known manner.

When device 4000 goes on-hook at the end of the call, the local device handler 7 clears the call using local call connection services 1 1, including sending a clear call request to the local device handler 13 for telephone 4001. The device handler 7 then terminates (including cleaning up its resources). The backup call services manager 6 receives notification of the termination of the device handler process 7 and updates the state table 10 to indicate that the device 4000 is idle. The backup call services manager 6 sends an off-hook request to the main controller 1 (via main controller handler 4) to re-establish control of the device by the main controller. If communication with the main controller 1 has not been re-established, then the device handler 13 instructs local connection services 11 to apply dial tone to the device 4001 and continues to manage requests from the device 4001. If communication with the main controller 1 has been re-established , the local device handler 13 is then terminated so that the main controller is able to resume control over subsequent requests for service from the device 4001 (or 4000).

While the local device handlers 7 and 13 exist, the main controller 1 is not permitted to take control of the associated devices 4000 and 4001 by virtue of the local device state in table 10 being indicated as "busy", such that backup call services manager 6 directs all device requests to the appropriate local device controllers. However, once the local device handlers 7 and 13 are terminated, call control may revert to the main controller (provided that communication has been re-established between the main controller 1 and remote peripheral 3, otherwise new local device handlers are created).

Alternatives and modifications to the invention are possible. For example, the local call control services 9 may be provided as part of the device handler(s) or as an independent entity. Distinct local device handlers can be created to service different types of telephony devices (e.g. trunks, H.323 terminals, etc.). All such alternatives and modifications may be made without departing from the sphere and scope of the invention as defined by the claims appended hereto.

What is claimed is:

1. A system for providing local call connection services via local call control services in a remote peripheral in the event of a loss of communication between the remote peripheral and a main controller, comprising:

a local memory within said remote peripheral for receiving and synchronizing copies of dialing plans and local device configurations from said main controller for use by said local call control services during said loss of communications;

a backup call services manager for receiving requests for service from devices connected to said remote peripheral, transmitting said requests to said main controller while said communication between the remote peripheral and main controller is established, and while said communication is a lost instantiating a local device handler for each of said requests;

a further local memory within said remote peripheral for maintaining current device state for each of said devices; and each said local device handler receiving a corresponding one of said requests and in response consulting said further local memory and using said local call control services for providing said local call connection services.

2. The system of claim 1, wherein said local call control services are integrated within each said local device handler.

3. The system of claim 1, wherein upon receipt of said request for service generated by said device said local device handler means determines operating status of said device and passes messages between said local call control service means and said local connection services to provide said service in accordance with said dialing plans and local device configurations.

4. The system of claim 1, wherein each said local device handler is an instantiation of a class of device handlers.

5. The system of claim 1, wherein said further local memory is maintained by said backup call services manager to reflect said device states.

6. The system of claim 5, wherein said device states include busy, idle, originating, and out of service.

* * * * *